United States Patent
Couck et al.

(10) Patent No.: US 8,220,718 B2
(45) Date of Patent: Jul. 17, 2012

(54) METHOD FOR POST-MANUFACTURING DATA TRANSFER TO AND FROM A SEALED DEVICE

(75) Inventors: Guy Louis Couck, Denderleeuw (BE); Frank Hoornaert, Bertum (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 842 days.

(21) Appl. No.: 12/210,691

(22) Filed: Sep. 15, 2008

(65) Prior Publication Data

US 2010/0065646 A1 Mar. 18, 2010

(51) Int. Cl.
G06K 19/00 (2006.01)
G06K 19/06 (2006.01)
G06K 5/00 (2006.01)
H01L 21/00 (2006.01)
H01L 23/02 (2006.01)

(52) U.S. Cl. ........ 235/492; 235/493; 235/487; 235/380; 438/127; 257/678

(58) Field of Classification Search .................... 438/19, 438/126, 127, 371; 257/E23.179, 678; 235/487, 235/492, 493, 380, 449, 451
See application file for complete search history.

(56) References Cited

U.S. PATENT DOCUMENTS

| | | | | |
|---|---|---|---|---|
| 5,126,541 A * | 6/1992 | Shinagawa | ..................... | 235/438 |
| 5,636,270 A * | 6/1997 | Davey | ........................... | 379/352 |
| 5,963,453 A * | 10/1999 | East | ............................... | 700/244 |
| 6,264,108 B1 * | 7/2001 | Baentsch | ..................... | 235/487 |
| 6,575,372 B1 * | 6/2003 | Everett et al. | ................. | 235/492 |
| 6,983,579 B2 * | 1/2006 | Rice et al. | ....................... | 53/494 |
| 7,006,893 B2 * | 2/2006 | Hart et al. | ..................... | 700/235 |
| 7,378,817 B2 | 5/2008 | Calhoon et al. | | |
| 7,392,059 B2 | 6/2008 | White et al. | | |
| 8,005,468 B2 * | 8/2011 | Marolia et al. | ................ | 455/418 |
| 2002/0050528 A1 * | 5/2002 | Everett et al. | ................. | 235/492 |
| 2002/0116330 A1 * | 8/2002 | Hed et al. | ........................ | 705/39 |
| 2003/0024994 A1 * | 2/2003 | Ladyansky | ..................... | 235/492 |
| 2003/0083939 A1 * | 5/2003 | Wohl | .............................. | 705/14 |
| 2003/0105964 A1 | 6/2003 | Brainard et al. | | |
| 2003/0132301 A1 * | 7/2003 | Selker | ........................... | 235/487 |
| 2004/0006541 A1 * | 1/2004 | Huddelston et al. | ............ | 705/51 |
| 2004/0030896 A1 * | 2/2004 | Sakamura et al. | ............ | 713/169 |
| 2004/0049718 A1 * | 3/2004 | Pax et al. | ...................... | 714/700 |
| 2004/0069856 A1 * | 4/2004 | Held et al. | ..................... | 235/492 |
| 2004/0144472 A1 * | 7/2004 | Cowie | ............................ | 156/64 |

(Continued)

OTHER PUBLICATIONS

Vivek Bapat et al., RFID in Manufacturing, 2004, Rockwell Automation, Milwaukee, United States of America.

*Primary Examiner* — Daniel Walsh
(74) *Attorney, Agent, or Firm* — RatnerPrestia

(57) ABSTRACT

The present invention is directed towards authentication tokens that are completely embedded in a non-conductive enclosure. The invention is based on the insight that it would be advantageous to separate the electronic data personalization of such tokens from the visual device personalization. The present application concerns an authentication token that allows communication with an external unit after the production of the nonconductive enclosure, in order to transmit or receive device identification data. As this communication need only take place during the manufacturing process, a low-power close-range transmission technique such as inductive coupling, capacitive coupling, or RFID communication suffices for this purpose. Accordingly, the present application discloses a method for manufacturing authentication tokens, and a token manufactured according to said method.teh 11 Claims, 2 Drawing Sheets

U.S. PATENT DOCUMENTS

| | | | |
|---|---|---|---|
| 2004/0144848 A1* | 7/2004 | Moll et al. | 235/492 |
| 2005/0181530 A1* | 8/2005 | Brugger et al. | 438/62 |
| 2005/0187837 A1* | 8/2005 | Eckstein et al. | 705/29 |
| 2005/0219051 A1* | 10/2005 | Nedblake | 340/572.1 |
| 2005/0271864 A1* | 12/2005 | van Driesten et al. | 428/195.1 |
| 2006/0010685 A1* | 1/2006 | Kobayashi et al. | 29/825 |
| 2006/0022802 A1* | 2/2006 | Bridgelall | 340/10.33 |
| 2006/0061475 A1* | 3/2006 | Moskowitz et al. | 340/572.3 |
| 2006/0118229 A1* | 6/2006 | Ohashi et al. | 156/60 |
| 2006/0145863 A1* | 7/2006 | Martin et al. | 340/572.8 |
| 2006/0145865 A1* | 7/2006 | Forster | 340/572.8 |
| 2006/0180647 A1* | 8/2006 | Hansen | 235/375 |
| 2006/0220795 A1* | 10/2006 | Limbachiya | 340/10.5 |
| 2006/0250252 A1* | 11/2006 | Nagai et al. | 340/572.7 |
| 2006/0277269 A1* | 12/2006 | Dent et al. | 709/217 |
| 2006/0283960 A1* | 12/2006 | Top | 235/492 |
| 2007/0045399 A1* | 3/2007 | Martin | 235/380 |
| 2007/0069895 A1* | 3/2007 | Koh | 340/572.1 |
| 2007/0115129 A1* | 5/2007 | Kessler | 340/572.3 |
| 2007/0125866 A1* | 6/2007 | Nishizawa et al. | 235/492 |
| 2007/0250920 A1* | 10/2007 | Lindsay | 726/7 |
| 2007/0273519 A1* | 11/2007 | Ichikawa et al. | 340/572.1 |
| 2008/0051193 A1* | 2/2008 | Kaminkow et al. | 463/25 |
| 2008/0056488 A1* | 3/2008 | Motoyama | 380/29 |
| 2008/0056496 A1* | 3/2008 | Parkinson et al. | 380/277 |
| 2008/0093027 A1* | 4/2008 | Niwa et al. | 156/387 |
| 2008/0150701 A1* | 6/2008 | Randmae | 340/10.5 |
| 2008/0191878 A1* | 8/2008 | Abraham | 340/572.1 |
| 2008/0237356 A1* | 10/2008 | Singleton et al. | 235/492 |
| 2008/0238689 A1* | 10/2008 | Ohashi | 340/572.8 |
| 2008/0308641 A1* | 12/2008 | Finn | 235/492 |
| 2009/0033463 A1* | 2/2009 | Posamentier | 340/10.1 |
| 2009/0055695 A1* | 2/2009 | Maddali | 714/724 |
| 2009/0159673 A1* | 6/2009 | Mullen et al. | 235/380 |
| 2009/0160613 A1* | 6/2009 | Hirota | 340/10.1 |
| 2009/0198618 A1* | 8/2009 | Chan et al. | 705/66 |
| 2009/0237221 A1* | 9/2009 | Battles et al. | 340/10.51 |
| 2010/0039594 A1* | 2/2010 | Golan et al. | 349/122 |
| 2010/0052912 A1* | 3/2010 | Arneson et al. | 340/572.7 |
| 2010/0223823 A1* | 9/2010 | Gordon | 40/316 |
| 2011/0000968 A1* | 1/2011 | Phillips et al. | 235/492 |
| 2011/0006120 A1* | 1/2011 | Baba et al. | 235/492 |

* cited by examiner

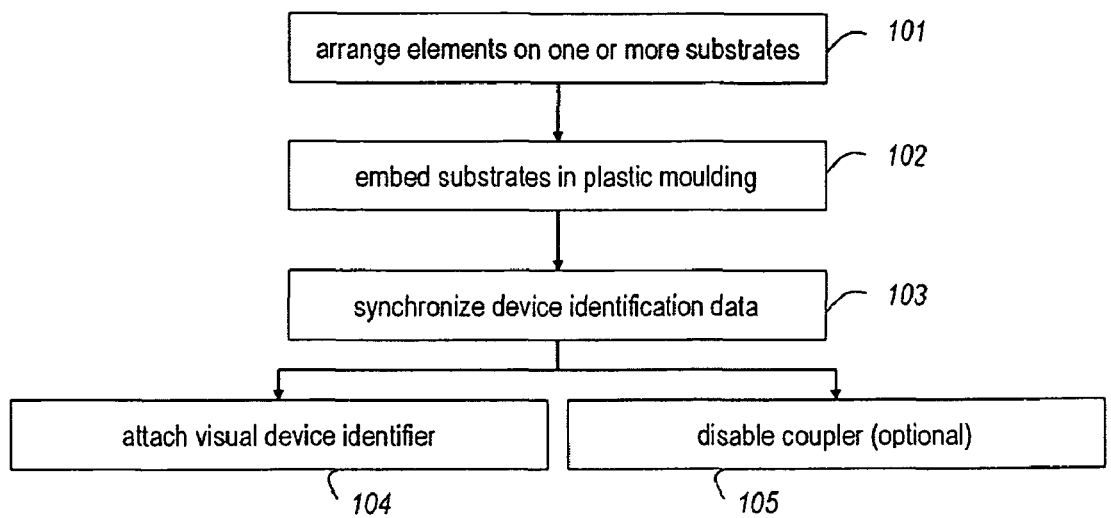
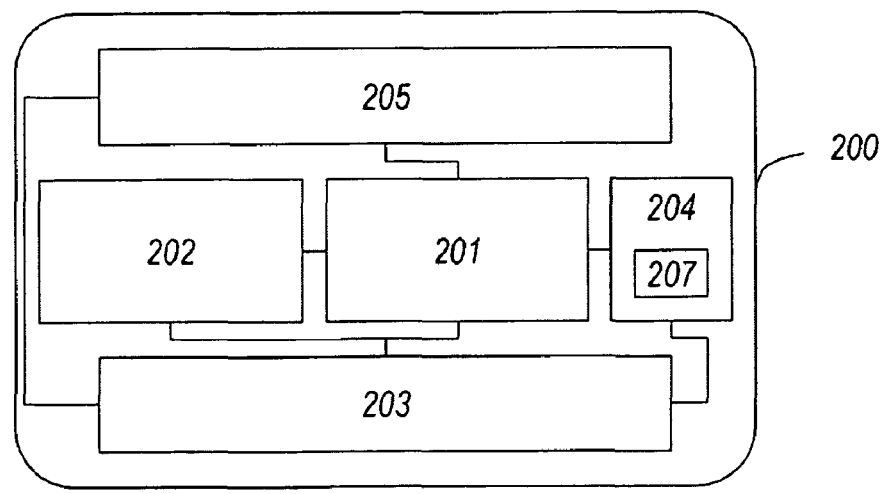

METHOD FOR POST-MANUFACTURING DATA TRANSFER TO AND FROM A SEALED DEVICE

TECHNICAL FIELD

The present invention relates to the field of manufacturing and initializing authentication tokens that are embedded in non-conductive material or moulding.

BACKGROUND ART

Making individual articles of manufacture distinguishable by means of a unique serial number is a generally accepted practice in quality control and product lifecycle management. For certain types of articles, individualization of the article plays a more fundamental role. Authentication tokens, for example, are used to authenticate the individual to whom they have been issued, and they rely for this purpose on a unique secret embedded within the token's memory, typically consisting of cryptographic key material. In order for successful authentication to take place, a credential generated by the processing unit inside the authentication token and passed on to the user must pass a cryptographic verification by an authentication server which has access to the same secret as the authentication token, or, in the case of asymmetric keys, to data that can mathematically ascertain that the credential was indeed based on the correct token secret. This entire scheme can only work if it is known throughout the deployment of the fleet of authentication tokens, which particular authentication token, and hence which secret, has been issued to which individual. A well-known example of an authentication token can be found in [U.S. Pat. No. 4,599,489 B (CARGILE, WILLIAM P.) 1986 Jul. 8].

Several types of electronic devices that are completely embedded in a non-conductive (e.g., plastic) enclosure are known in the art. Such enclosures are used for a variety of reasons, including making the device waterproof, tamperproof, more robust, or more aesthetically pleasing. The property of being tamperproof makes such enclosures an attractive option for authentication tokens.

Devices of this type preferably have no electrical or ohmic contacts on the outside of the enclosure, because such contacts complicate the manufacturing process and because their presence would be detrimental to the desired properties described above. Hence, a drawback of this type of enclosure is that it is not possible to communicate with the device through traditional electrical or ohmic contacts, after the manufacturing of the enclosure. The same applies if the enclosure does in fact have electrical contacts, where these contacts provide access to a different function, and are separated from the rest of the device (e.g., the surface contacts of the chip of a combined contact-type smart card and strong authentication token, which in some implementations provide access to the smart card functions but not to the strong authentication device). Any electronic data personalization in the form of identification, programming, or initialization of the device must therefore take place before the manufacturing of the enclosure. This poses a problem if the devices are individualized, and an additional visual identification, linked with the electronic data personalization of the devices, is to be placed on the outside of the device after the manufacturing of the enclosure.

This post-manufacturing communication problem applies, inter alia, to authentication tokens, which are internally programmed with a serial number and a secret key, and which also need to carry an externally visible indication of said serial number. This problem does not, however, apply to contactless smart cards such as those according to standard ISO/IEC 14443, which rely for their normal operation on their embedded wireless near-field communication engine, and which can therefore be questioned (and often even reprogrammed) at any time after manufacturing. These contactless smart cards do not offer the functionality of an authentication token, because they are not equipped to communicate a credential to the end user.

The traditional way to resolve the problem of matching an electronic data personalization with a visual device identifier, is to maintain a highly synchronized manufacturing process, wherein the devices are provided with their visual device identifiers in the same order in which they are electrically individualized. This system is prone to desynchronization. Furthermore, once desynchronization occurs, it may be difficult, inefficient, or even impossible to retrieve the correct identity of a batch of devices that have been labelled incorrectly.

It thus appears that it would be advantageous to separate the electronic data personalization from the visual device personalization. Such separation may be obtained either by performing the electronic data personalization of the device during or after attaching the visual device identifier (allowing the entity that performs the electronic data personalization to ascertain the identity of the device), or by reading out the electrical identity of the device at the time of attaching the visual device identifier. For both of these scenarios, a problem that needs to be addressed is that of communicating with the device through the non-conductive moulding.

Several approaches to this problem are known in the art. These include the use of inductive coupling, capacitive coupling, and enclosed RFID transponders for communicating with the device.

White et al. [U.S. Pat. No. 7,392,059 B (WHITE ET AL.) 2008 Jun. 24] disclose a fascia, moulded from a plastics material, and a passive data storage device, embedded in the fascia during the moulding process. The main body of a mobile phone according to White et al. carries a reader unit, positioned in such a way that, when the fascia is fitted to the main body, the passive data storage device will be in range of the reader unit so that couplers of the passive data storage device and reader unit couple to enable the passive data storage device to derive a power supply from a signal supplied by the reader unit and to transmit control data contained in its memory. White et al. further disclose a circuit to achieve inductive coupling between the reader unit and the fascia.

Calhoon et al. [U.S. Pat. No. 7,378,817 B (CALHOON ET AL.) 2008 May 27] disclose using the power transmission coil of a power source and the power pickup coil of a power adapter of a host device to provide inductive data communications over an inductive pathway.

In both references cited above, the inductive or capacitive coupling is used to separate controlling data contained in a unit with a passive storage device, from the execution logic, contained in a separate unit adapted to read the controlling data from the first unit, both units being intended to be used together by the end user. The references do not address the use of inductive or capacitive coupling for post-manufacturing identification of individualized articles.

RFID transponders or "tags" are active or passive components that can store information and interact with a reader (interrogator) via a radio-frequency field. They are used for automatic identification of inventory, merchandise, animals and people. In the domain of authentication, RFID tags are commonly used operationally to control access to buildings or transportation facilities, or to pay at toll booths or fuel stations. Certain advantages of using RFID in a manufacturing environment are known in the art [Rockwell Automation. RFID in Manufacturing. Edited by BAPAT, Vivek, et al. Milwaukee: Rockwell Automation, 2004.], particularly in the context of using RFID to individualize functionally identical articles, in order to track them throughout their lifecycle.

DISCLOSURE OF THE INVENTION

Technical Problem

As authentication tokens should be reasonably tamperproof, it is desirable to have authentication tokens that are completely embedded in a non-conductive enclosure. The technical problem to be solved is how to access the personalized electronic data of the device after the manufacturing of the enclosure, and how to match the electronic data personalization and the externally perceivable identity of such authentication tokens. More specifically, the present invention provides a process for individualization of authentication tokens, and for attaching a corresponding visual identifier. Hereinafter, the phrase "attaching a visual identifier" is used to denote any method of visually individualizing the authentication tokens, including embossing, engraving, laser etching, and printing a unique identification number or code on the authentication token itself, as well as sticking a label bearing a unique identification number or code onto the authentication token, or packaging the authentication token in a container having a unique identification number or code printed thereon.

Technical Solution

The present invention is directed towards authentication tokens that are completely embedded in a non-conductive enclosure. As there can be no traditional ohmic contacts on the outside of these authentication tokens, a power source such as a battery and a secure user interface such as a display must be provided in the authentication token, in addition to a memory for storing cryptographic key material and a processing unit for generating client credentials based on said cryptographic key material. The memory and the processing unit may be combined in a single component. The display is deemed to be secure for the purposes of this invention, if it forms an non-removable part of the token, with no user-accessible connectors. The cryptographic key material and, optionally, the software or firmware of the processing unit, act to personalize the different authentication tokens. Hereinafter, the term "individualized data" is understood to include both electronic personalization data (among other things cryptographic key data, software, or firmware for the processing unit) and device identification data (any amount of data that can be matched to a particular set of electronic personalization data).

The present invention is based on the insight that it would be advantageous to have authentication tokens that allow communication with an external unit after the production of the nonconductive enclosure, in order to transmit or receive individualized data. As this communication need only take place during the manufacturing process, a low-power close-range transmission technique such as inductive coupling, capacitive coupling, or RFID communication suffices for this purpose. As the authentication tokens of interest are equipped with a battery, the coupler may operate on battery power. Alternatively, the coupler may draw power from the signal provided by the external unit.

The present invention is further based on the insight that the electronic data personalization of authentication tokens, i.e., the provisioning of relevant secrets, serial numbers, firmware, etc., may take place either before or after manufacturing of the nonconductive enclosure.

In the case where the electronic data personalization of the authentication tokens takes place before manufacturing of the nonconductive enclosure, it is advantageous to provide an external unit capable of reading the relevant device identification data through the coupler, at the same manufacturing stage at which a visible device identifier, such as a label bearing a serial number, is being attached to the authentication token. RFID technology can be used to implement this scheme, if an RFID tag with a unique ID is provided inside on the inlay at the time of manufacturing. It suffices that the unique ID is registered in a database at the time of electronic data personalization, where it is linked with the electronic personalization data. A visual device identifier is attached after the manufacturing of the moulding. This visual device identifier can then conveniently be synchronized with the electrical identity of the device by reading both with the appropriate means, and storing their relationship in a database, or by choosing the correct visual device identifier to attach to a token with a given unique ID by looking up the unique ID in a database with pre-stored relationships.

In the case where the electronic data personalization of the authentication tokens takes place after manufacturing of the nonconductive enclosure, it is advantageous to provide an external unit capable of writing the relevant electronic data personalization data to the authentication token through the coupler, either at the same manufacturing stage at which the visible device identifier is being attached to the authentication token, or at a later manufacturing stage. This part of the process can be automated if the visible device identifier is machine-readable, e.g. if it contains a barcode or a serial number in an OCR-friendly font. In an alternative scheme the electronic data personalization of the authentication tokens can take place through the coupler after manufacturing of the nonconductive enclosure, but before attaching the visible device identifier; the process then proceeds as described above for the case of electronic data personalization before the manufacturing of nonconductive enclosure, i.e. by reading out the electronic personalization data or device identification data through the coupler again.

A third insight underlying this invention, is that, in order for the authentication token to be tamperproof after manufacturing, the wireless channel may be definitively disconnected or disabled after having served its purpose in the manufacturing process described above. This effect may be obtained by inducing a current that will destroy a special-purpose fuse in the coupling circuit.

Advantageous Effects

The advantage of the method disclosed in the present application is that electronic data personalization in the form of identification, programming, or initialization of the authentication tokens no longer needs to take place before the manufacturing of the non-conductive enclosure. Under the method of the present invention, there is no more need for a highly synchronized manufacturing process, wherein the devices are provided with their visual device identifiers in the same order in which they are electrically individualized, avoiding the inherent risks of desynchronization. In cases where the electronic data personalization scheme is customer-specific, devices manufactured under the method of the present invention remain generic for a longer time, thus avoiding the need to build separate inventories of different classes of devices personalized according to different customer-specific schemes.

BRIEF DESCRIPTION OF THE DRAWINGS

The foregoing and other features and advantages of the invention will be apparent from the following, more particular description of several embodiments of the invention, as illustrated in the accompanying drawings.

FIG. 1 shows a flow chart of the method of the present invention.

FIG. 2 provides a schematic overview of the components of an authentication token 200 according to the present invention, without the non-conductive enclosure and the visual device identifier.

MODE(S) FOR CARRYING OUT THE INVENTION

Figure 3:
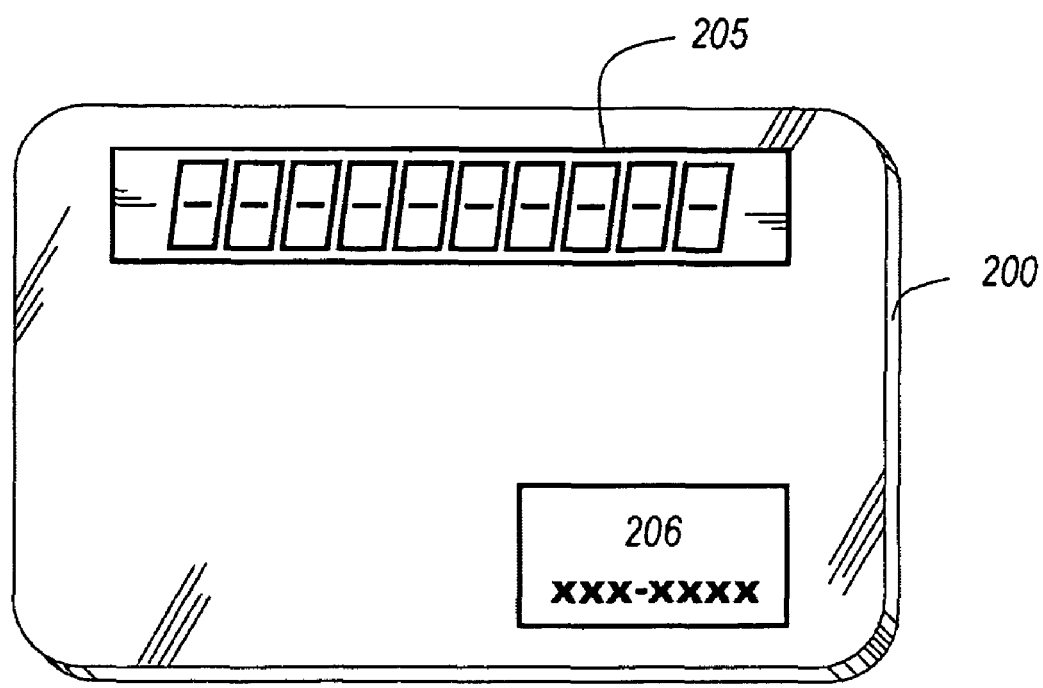
FIG. 3 shows a completed authentication token 200 according to the present invention, wherein the secure user output interface 205 is embodied as a numeric display, and the visual device identifier 206 is shown as a serial number. The size of the display and the length of the serial number were chosen arbitrarily for illustration purposes only.

In a preferred embodiment, the method of the present invention comprises arranging 101 on one or more substrates a processing unit 201, a memory 202 for storing individualized data, a battery 203, a coupler 204 for synchronizing individualized data with an external control unit, and a secure user output interface 205; subsequent to said arranging 101, embedding 102 said one or more substrates in a plastic moulding; subsequent to said embedding 102, synchronizing 103 said individualized data; and attaching 104 a visual device identifier 206 to the outside of said moulding. In the case of the visual device identifier shown in FIG. 2 as element 206 the identification comprises an alpha-numeric string "xxx-xxxx". It should be apparent that characters or elements of the visual identifier 206 need not be alpha-numeric or even characters as any visually identifiable symbols or patterns could also be used.

In one embodiment of the method of the present invention, said coupler 204 is also adapted to receive power from an external power unit, and the method further comprises providing power to said coupler 204.

In one embodiment of the method of the present invention, said synchronizing comprises transmitting said individualized data from said external control unit to said coupler 204, said individualized data comprising electronic personalization data. In another embodiment, said synchronizing comprises receiving said individualized data from said coupler 204 in said external control unit, said individualized data comprising device identification data.

In one embodiment of the method of the present invention, said coupler 204 is inductive. In another embodiment, said coupler 204 is capacitive. In yet another embodiment, said coupler 204 is part of an RFID tag.

In one embodiment of the method of the present invention, said secure user output device 205 comprises a display.

In one embodiment of the method of the present invention, said authentication token 200 further comprises a component 207 for definitively disabling said coupler, and the method further comprises activating 105 said component 207 after said synchronizing 103. In one particular embodiment, said component 207 is a fuse.

In a preferred embodiment, the authentication token 200 of the present invention comprises a processing unit 201, a memory 202 for storing individualized data, a battery 203, a coupler 204 for synchronizing individualized data with an external control unit, a secure user output interface 205, and a visual device identifier 206 on the outside of said moulding.

In one embodiment of the token of the present invention, said coupler 204 is also adapted to receive power from an external power unit.

In one embodiment of the token of the present invention, said coupler 204 is further adapted to receive said individualized data from said external control unit for storage in said memory 202, said individualized data being electronic personalization data. In another embodiment, said coupler 204 is further adapted to transmit said individualized data from said memory 202 to said external control unit, said individualized data being device identification data.

In one embodiment of the token of the present invention, said coupler 204 is inductive. In another embodiment, said coupler 204 is capacitive. In yet another embodiment, said coupler 204 is comprised in an RFID tag. In this embodiment the memory 202 as well as the coupler 204 are components of the RFID tag.

In one embodiment of the token of the present invention, said secure user output device 205 comprises a display.

In one embodiment of the token of the present invention, said authentication token 200 further comprises a component 207 for definitively disabling said coupler. In one particular embodiment, said component 207 is a fuse.

The invention claimed is:

1. A method for manufacturing personalized authentication tokens embedded in a non-conductive moulding having secret cryptographic key data, comprising:
   arranging on one or more substrates:
      a memory that stores individualized data comprising device identification data and a particular set of electronic personalization data comprising secret cryptographic key data wherein the device identification data is associated with the particular set of electronic personalization data,
      a processing unit that generates client credentials based on said secret cryptographic key data, said client credentials for authenticating a user through cryptographic verification of said client credentials by an authentication device external to the token after said client credentials have been communicated to said authentication device external to the token,
      a battery,
      a capacitive or inductive coupler that communicates with an external control unit, and
      a secure user output interface that communicates said client credentials to said user;
   storing the individualized data in the memory;
   subsequent to said arranging and storing, embedding said one or more substrates in said non-conductive plastic moulding such that the manufactured authentication token has no external electrical or ohmic contacts;
   subsequent to said embedding, attaching a visual device identifier to the outside of said moulding;
   subsequent to said embedding, synchronizing the token to create a correspondence between said individualized data and the visual device identifier of the token, said synchronizing including receiving said device identification data from the memory through the coupler and establishing a correspondence in a database external to the token between the individualized data and the visual device identifier using the received device identification data; and wherein said manufacturing takes place prior to the token being provided to a user for a first use.

2. The method of claim 1, wherein said coupler is also adapted to receive power from an external power unit, said method further comprising providing power to said coupler.

3. The method of claim 1, wherein said memory and said coupler comprise memory and coupler components of an RFID tag.

4. The method of claim 1, wherein said secure user output interface comprises a display.

5. The method of claim 1, wherein a component for definitively disabling said coupler is arranged on said one or more substrates, said method further comprising activating said component after said synchronizing.

6. The method of claim 1, wherein, prior to said attaching, said visual identifier is chosen taking into account said device identification data.

7. A method for manufacturing personalized authentication tokens embedded in a non-conductive moulding having secret cryptographic key data, comprising:

arranging on one or more substrates:
- a memory that stores individualized data comprising a particular set of electronic personalization data comprising secret cryptographic key data,
- a processing unit that generates client credentials based on said secret cryptographic key data, said client credentials for authenticating a user through cryptographic verification of said client credentials by an authentication device external to the token after said client credentials have been communicated to said authentication device external to the token,
- a battery,
- a capacitive or inductive coupler that communicates with an external control unit, and
- a secure user output interface that communicates said client credentials to said user;

storing the individualized data in the memory;

subsequent to said arranging, embedding said one or more substrates in said non-conductive plastic moulding such that the manufactured authentication token has no external electrical or ohmic contacts;

subsequent to said embedding, attaching a visual device identifier to the outside of said moulding;

establishing a correspondence in a database external to the token between the individualized data and the visual device identifier;

subsequent to said embedding, synchronizing the token to create a correspondence between said individualized data and the visual device identifier of the token, said synchronizing including retrieving the particular set of electronic personalization data from the external database, transmitting said particular set of electronic personalization data from the external control unit to the token through the coupler, and storing said particular set of electronic personalization data in the memory of the token; and wherein said manufacturing takes place prior to the token being provided to a user for a first use.

8. The method of claim 7, wherein said synchronizing comprises machine-reading said visual device identifier.

9. The method of claim 7, wherein said coupler is also adapted to receive power from an external power unit, said method further comprising providing power to said coupler.

10. The method of claim 7, wherein said secure user output interface comprises a display.

11. The method of claim 7, wherein a component for definitively disabling said coupler is arranged on said one or more substrates, said method further comprising activating said component after said synchronizing.

* * * * *